Sept. 20, 1966 C. E. BRANICK 3,273,857
EARTH-MOVER TIRE TRANSPORTER
Filed April 20, 1965 2 Sheets-Sheet 1
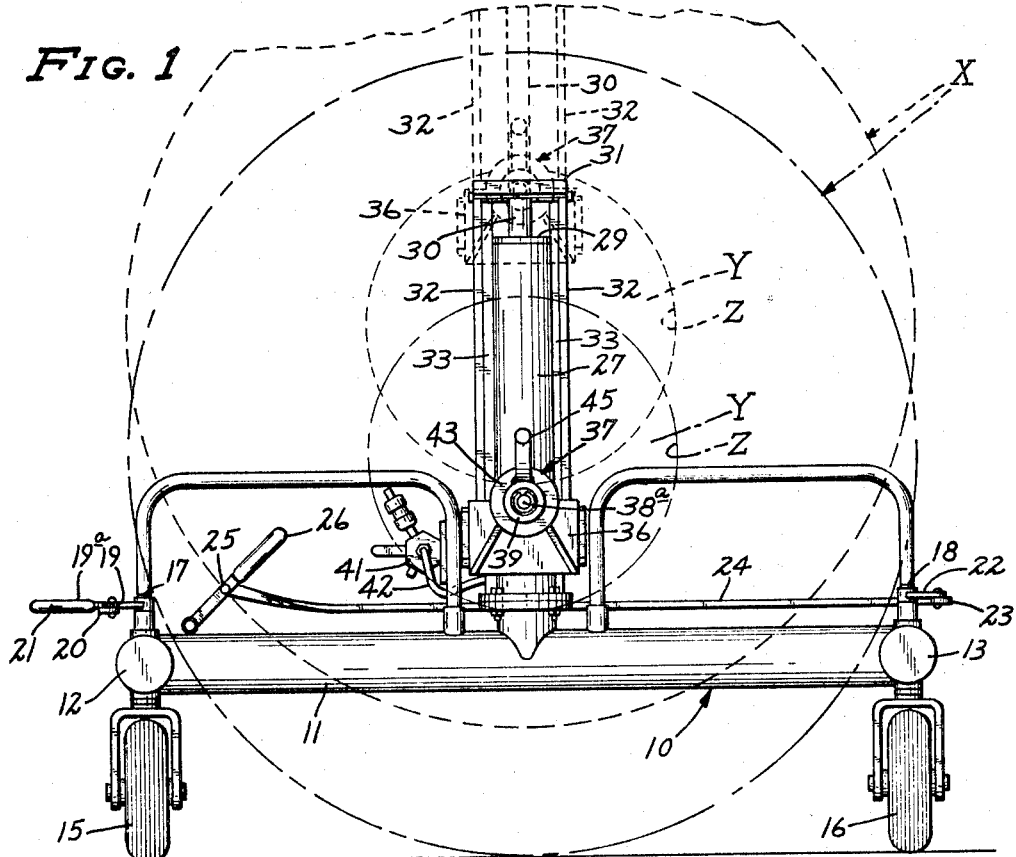
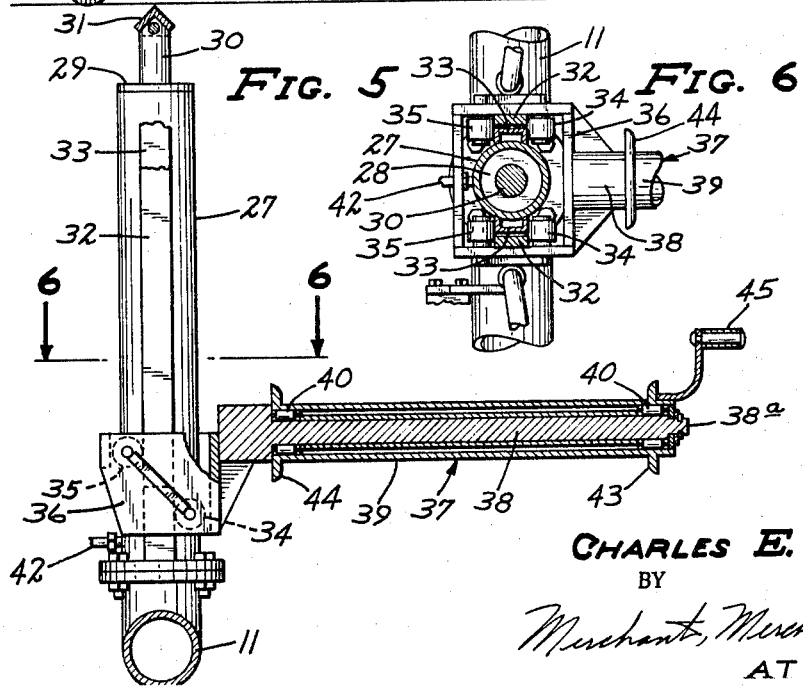
INVENTOR.
CHARLES E. BRANICK
BY
Merchant, Merchant & Gould
ATTORNEYS Sept. 20, 1966  C. E. BRANICK  3,273,857
EARTH-MOVER TIRE TRANSPORTER
Filed April 20, 1965  2 Sheets-Sheet 2

INVENTOR.
CHARLES E. BRANICK
BY
Merchant, Merchant & Gould
ATTORNEYS

United States Patent Office 3,273,857
Patented Sept. 20, 1966

3,273,857
EARTH-MOVER TIRE TRANSPORTER
Charles E. Branick, % Branick Mfg. Co., Box 1937,
Fargo, N. Dak.
Filed Apr. 20, 1965, Ser. No. 449,520
5 Claims. (Cl. 254—2)

My invention relates generally to pneumatic tire-handling equipment, and more particularly to devices for handling of large earth-mover tires and the like.

Still more specifically, my invention provides a device for lifting, transporting, and rotating, for purposes of inspection and repair, pneumatic tires of the character immediately above described.

The primary object of my invention is the provision of a structure of the type above described which is readily mobile, and which may be used by a single individual to pick up from a generally upright position for purposes of transportation and inspection, large pneumatic tire casings of the earth-mover type.

A further object of my invention is the provision of a device of the class above described which is rugged and durable in construction, and is extremely simple and easy to operate.

A still further object of my invention is the provision of a device of the class described which incorporates but a minimum of working parts and is not unduly expensive to produce.

The above and still further objects of my invention will become apparent from the following detailed specification, appended claims, and attached drawings.

Referring to the drawings wherein like characters indicate like parts throughout the several views:

FIG. 1 is a view in front elevation of my novel structure;

FIG. 5 is an enlarged view in vertical section as seen along the irregular line 5—5 of FIG. 3; and FIG. 6 is a horizontal sectional view as seen from the line 6—6 of FIG. 5.

Figure 2:
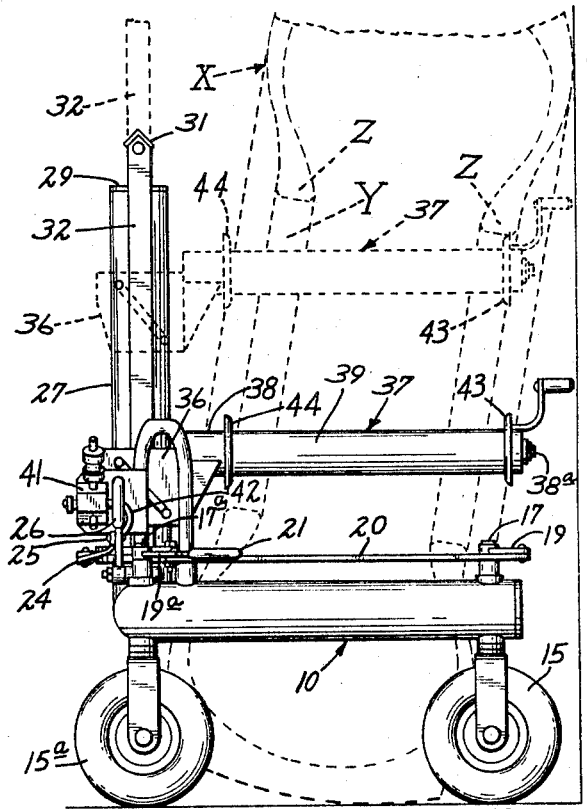
FIG. 2 is a view in side elevation.
Figure 4:
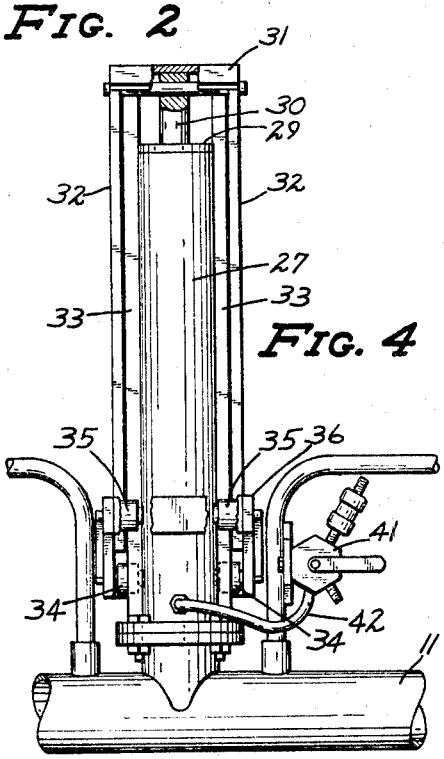
FIG. 4 is an enlarged fragmentary detailed view in rear elevation of the lifting mechanism of the present invention, portions thereof broken away and shown in section.
Figure 3:
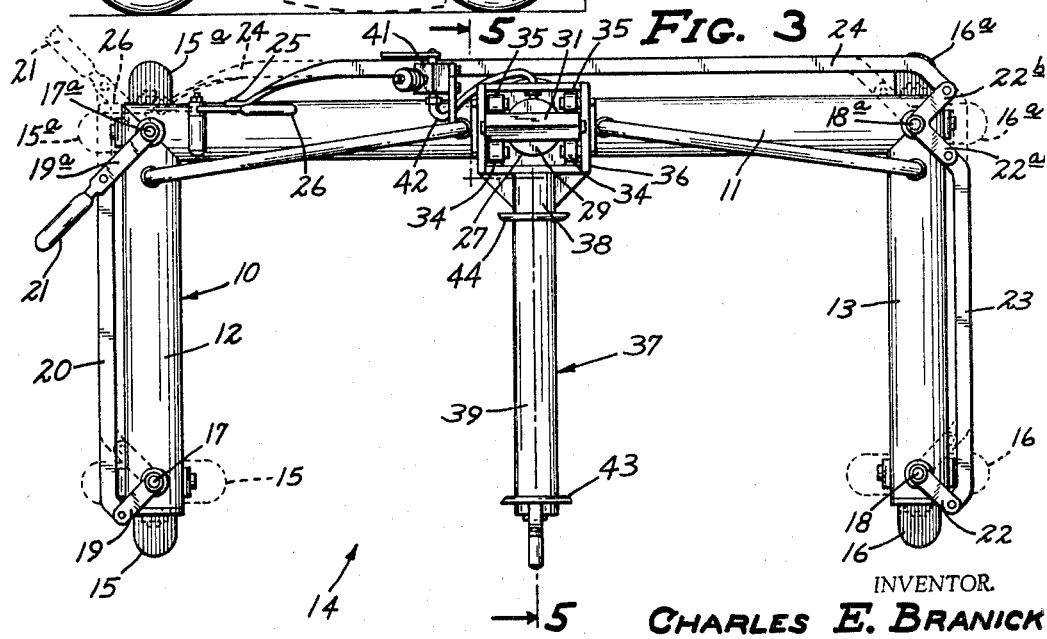
FIG. 3 is a view in top plan.

Referring with greater particularity to the drawings, the numeral 10 indicates in its entirety a generally U-shaped frame structure, the horizontally disposed rear frame member thereof being identified by 11 and the laterally spaced opposite side frame members by 12, 13. Frame structures 11, 12, and 13 cooperate to define a forwardly opening tire-receiving mouth 14. To impart mobility to the frame 10, pairs of laterally spaced wheel elements 15, 15a, and 16, 16a are journalled for rotation on vertically disposed pintle elements 17, 17a, 18, 18a. As shown, the wheel elements 15, 16 are located adjacent the extended forward ends of side frame members 12, 13, respectively, whereas the wheel elements 15a, 16a are positioned at the point of juncture of the frame elements 12, 13 with opposite ends of the rear frame member 11.

For the purpose of steering or guiding the frame 10 so as to cause a pneumatic tire casing X to be received through the open mouth 14, for purposes which will hereinafter be explained in detail, the pairs of wheel elements 15, 15a, and 16, 16a are connected together for common steering movements, the former through means of crank arms 19, 19a, respectively, which are joined together at their outer ends through the medium of a tie rod 20. As shown, the crank arm 19a is formed to provide at its outwardly projected end a handle 21. The pair of wheel elements 16, 16a likewise have crank arms 22, 22a connected, respectively, to the pintles 18, 18a, which, in turn, are connected together at their extended ends by tie rod 23. As shown, crank arm 22a is in the nature of a bellcrank, the other arm of which is identified by 22b. Pivotally connected to the extended end of the arm 22b is a control lever 24, which, in turn, is pivotally secured as at 25 to the intermediate portion of an operating lever 26.

Mounted and guided for raising and lowering movements on the intermediate portion of the rear frame member 11 is an upstanding fluid-operated piston-cylinder device, the cylinder of which is identified by 27 and the piston by 28. Secured fast to the piston 28 and projecting upwardly therefrom in snug sliding engagement with the upper end 29 of the cylinder 27 is a plunger 30. Fast on the upper end of the plunger 30 is a cross-head 31, to opposite ends of which are secured and depend hanger brackets 32. Secured fast to the exterior surface of the cylinder 27 in the same plane as the hanger brackets 32 are diametrically opposed rails 33 upon the opposite side surfaces of which ride laterally spaced pairs of front and rear roller elements 34, 35, respectively, which are secured fast on a carriage 36 carried by the lower end portions of the hanger brackets 32. Referring particularly to FIG. 5, it will be noted that the forwardly disposed roller elements 34 are disposed in a plane below that of the rearwardly disposed roller elements 35 so as to support the load carried by the forwardly projecting lifting arm 37 which, in turn, is carried by the carriage 36.

As shown, the lifting arm 37 includes a horizontally disposed spindle 38, the forward end 38a of which terminates substantially within a vertical plane defined by the extended forward ends of the opposed side frame members 12, 13, and an elongated sleeve 39 which is journalled for rotation upon and concentric with the spindle 38 by means of suitable bearings 40.

When it is desired to pick up an earth-mover tire X with my novel structure, above described, as illustrated in FIGS. 1 and 2, the frame 10 is steered into a position wherein the tire casing X is caused to enter the mouth 14 with the casing X in generally upright position and with the axis of the central opening Y of the tire casing X generally parallel to the axis of the lifting arm 37. The lifting arm 37 is then caused to pass through the opening Y and fluid under pressure is caused to enter the lower end of the cylinder 27 through conventional valve mechanism 41 and conduit means 42 from a source of supply, not shown, whereby to elevate the piston 28 and parts 30, 32, 34, 35, 36, 37 associated therewith. In this manner, the beads Z of the tire casing X are caused to engage the sleeve 39 and the tire casing X is elevated from the floor or other supporting surface wherein it is indicated by broken lines in FIG. 1 to the elevated position indicated therein by dotted lines. For the purpose of centering the tire casing X upon the sleeve 39, circumferentially extended radially projecting bead engaging front and rear flanges 43, 44, respectively, are provided. Obviously, when the tire is so suspended, it may be transported with a minimum of effort upon a floor or other supporting surface.

On the other hand, when it is desired to rotate the tire for purpose of inspection or repair, it is but necessary for the operator to rotate the sleeve 39 by means of a hand crank 45 secured fast on the extended end of the sleeve 39 and projecting generally axially outwardly therefrom.

When it is desired to again lower the casing X into engagement with the floor or other supporting surface, it is but necessary to manipulate the valve mechanism 41 so as to permit the fluid under pressure to escape through conduit 42 to atmosphere, whereby to allow the arm 37 to drop away from contact with the beads Z under force of gravity.

As indicated in FIG. 2, my novel device may be used to elevate a tire casing X even though same is in the slightly tilted position which it assumes when caused to lie against the wall or other vertically disposed surface.

My invention has been throughly tested and found to be completely satisfactory for the accomplishment of the above objects; and while I have disclosed a preferred embodiment thereof, same may well be capable of modification without departure from the scope and spirit of the appended claims.

What is claimed is:

1. In a device of the class described,
   (a) mobile frame structure including a rear frame member and laterally spaced opposite side frame members which cooperate to define a forwardly opening tire-receiving mouth,
   (b) a horizontally disposed lifting arm secured to the intermediate portion of said rear frame member and projecting forwardly therefrom and adapted to be received within the central opening of a tire casing received within said mouth when the axis of said tire casing opening is generally parallel to the axis of said lifting arm,
   (c) means mounting and guiding said arm for raising and lowering movements,
   (d) means for imparting raising movements to said arm, and
   (e) means associated with said arm for imparting rotary movements to a tire casing suspended therefrom.

2. The structure defined in claim 1 in which the mobility of said frame structure is imparted thereto by means of laterally spaced pairs of wheel elements mounted for rotation about vertical axis, and in further combination with means for imparting steering movements to said pairs of wheels.

3. The structure defined in claim 2 in which said last-mentioned means includes independent means for imparting steering movements to each pair of wheels.

4. The structure defined in claim 1 in which the means for imparting rotary movements to said tire casing comprises
   (a) an elongated cylindrical sleeve journalled for rotation in overlying concentric relationship to said arm,
   (b) and a crank arm secured to the forward end portion of said sleeve and projecting generally axially outwardly therefrom.

5. The structure defined in claim 4 in further combination with circumferentially extended radially projecting tire casing limiting flanges on opposite end portions of said sleeve.

References Cited by the Examiner
UNITED STATES PATENTS

| | | |
|---|---|---|
| 2,117,073 | 5/1938 | Wochner. |
| 2,357,803 | 9/1944 | Barrett. |
| 2,490,233 | 12/1949 | Schildmeier _____ 254—2 X |
| 2,545,440 | 3/1951 | Barber _____ 254—2 X |
| 2,797,004 | 6/1957 | Miller _____ 214—331 |
| 2,852,151 | 9/1958 | Smith _____ 214—332 |
| 2,883,858 | 4/1959 | Bishman _____ 214—340 X |
| 2,979,123 | 4/1961 | Frohlich et al. _____ 157—13 |
| 3,145,859 | 8/1964 | Barosko _____ 214—331 |

WILLIAM FELDMAN, *Primary Examiner.*

M. S. MEHR, *Assistant Examiner.*